(12) United States Patent
Nakagoshi (10) Patent No.: US 8,648,967 B2
(45) Date of Patent: Feb. 11, 2014

(54) VIDEO SIGNAL PROCESSING DEVICE AND METHOD

(71) Applicant: JVC Kenwood Corporation, Yokohama (JP)

(72) Inventor: Ryosuke Nakagoshi, Kamakura (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 13/903,494

(22) Filed: May 28, 2013

(65) Prior Publication Data

US 2013/0321705 A1 Dec. 5, 2013

(30) Foreign Application Priority Data

May 31, 2012 (JP) ................................. 2012-124260

(51) Int. Cl.
*H04N 5/21* (2006.01)

(52) U.S. Cl.
USPC ............................ 348/606; 348/607; 348/625

(58) Field of Classification Search
USPC ......... 348/607, 606, 624, 625, 630, 620, 621, 348/627; 382/275, 254, 260–266
IPC ....................................................... H04N 5/21
See application file for complete search history.

(56) References Cited

U.S. PATENT DOCUMENTS 7,782,401 B1 * 8/2010 Chou ............................ 348/625
2004/0012720 A1 * 1/2004 Alvarez ........................ 348/607

FOREIGN PATENT DOCUMENTS

JP 2001-036770 A 2/2001
JP 2007-194775 A 8/2007

* cited by examiner

*Primary Examiner* — Sherrie Hsia
(74) *Attorney, Agent, or Firm* — Nath, Goldberg & Meyer; Jerald L. Meyer; Stanley N. Protigal (57) ABSTRACT

A multiband signal generator generates multiband signals from 21 lines of input data by using a subset of N lines with each line delayed from 1 line to N lines respectively. M line buffers delay the multiband signals such that each line is delayed from 1 line to M lines respectively. An analyzer detects correlations between video data by selecting regions with a maximum size M×M in the multiband signals, and analyzes characteristics of the video data. A multiband signal generator generates multiband signals with cutoff frequencies based on an analysis result from the analyzer, by using the data from 1-line through N-line delayed multiband signal. An amplitude adjuster and synthesizer unit adjusts and synthesizes amplitudes of the multiband signals.

10 Claims, 6 Drawing Sheets

VIDEO SIGNAL PROCESSING DEVICE AND METHOD

CROSS REFERENCE TO RELATED APPLICATION

This application is based upon and claims the benefit of priority under 35 U.S.C. §119 from Japanese Patent Application No. 2012-124260, filed on May 31, 2012, the entire contents of which are incorporated herein by reference.

BACKGROUND

The embodiment relates to a video signal processing device and a method for executing at least one of noise reduction, enhancement, and smoothing of a video signal.

As a video signal processing device, a noise reduction circuit that reduces noise contained in a video signal, or an enhancement circuit that enhances a video signal is often used. Also, a smoothing circuit that enhances defocusing of a defocused image, or performs so-called smoothing, is sometimes used as a video signal processing device.

SUMMARY

As an example, when a noise reduction circuit is located in an input stage of an enhancement circuit, the part that is intended to be enhanced by the enhancement circuit is attenuated at the noise reduction circuit, which makes it impossible to obtain the desired effect of the enhancement circuit.

In a conventional video signal processing device, various signal processing circuits including a noise reduction circuit, an enhancement circuit, and a smoothing circuit are present independently, and there is a problem that it is difficult to optimally execute one or a plurality of noise reduction, enhancement, and smoothing of a video signal in accordance with the characteristics of the video signal (the characteristics of the image).

Since the noise reduction circuit, the enhancement circuit, and the smoothing circuit are present independently, there is a problem that circuit size is likely to be relatively large.

The embodiment is accomplished in view of the above problems. Therefore, one object of the embodiment is to provide a video signal processing device and method by which at least one of noise reduction, enhancement, and smoothing is executed optimally to a video signal in accordance with the characteristics of the video signal. Another object of the embodiment is to provide a video signal processing device and method by which noise reduction, enhancement, and smoothing are selectively executed to a video signal while reducing the circuit size.

In order to solve the problems of the above-mentioned conventional techniques, a first aspect of the embodiment provides a video signal processing device comprising: an N line buffer configured to delay input video data such that lines are delayed from 1 line to N lines respectively to create delayed input video data, where N is an integer of 2 or greater; a first multiband signal generator configured to generate first multiband signals that are obtained by dividing the delayed input video data output from the N line buffer into a first plurality of frequency bands, each having data lines delayed from 1 line to X lines respectively, where X is an integer of 2 or greater and smaller than N; M line buffers configured to delay each of the data in the first plurality of frequency bands output from the first multiband signal generator such that lines are delayed from 1 line to M lines respectively, where M is an integer; an analyzer configured to analyze characteristics of the input video data by selecting regions with a maximum of M horizontal pixels and M vertical lines in the data in the first plurality of frequency bands which is output from the M line buffers such that lines are delayed from 1 line to M lines respectively, and to detect correlations in each of the regions, between source data that is equivalent to the input video data, and the data in the first plurality of frequency bands; a second multiband signal generator configured to set a cutoff frequency based on a result of the analysis by the analyzer, and generate second multiband signals which are obtained by dividing the delayed input video data output from the N line buffer into a second plurality of frequency bands; and an amplitude adjuster and synthesizer configured to adjust respective amplitudes of the data in the second plurality of frequency bands output from the second multiband signal generator, based on the result of the analysis by the analyzer, and to synthesize and output the data in the second plurality of frequency bands.

A second aspect of the embodiment provides a video signal processing method comprising: delaying input video data such that each line is delayed from 1 line to N lines respectively to create delayed input video data using an N line buffer, where N is an integer of two or greater; generating first multiband signals that are obtained by dividing the delayed input video data into a first plurality of frequency bands, having data lines delayed from 1 line to X lines respectively, where X is an integer of 2 or greater and smaller than N; delaying each of the data in the first plurality of frequency bands in the first multiband signals such that lines are delayed from 1 line to M lines respectively by using M line buffers, where M is an integer; analyzing characteristics of the input video data by selecting regions with a maximum of M horizontal pixels and M vertical lines in the data in the first plurality of frequency bands which is delayed by the M line buffers such that lines are delayed from 1 line to M lines respectively, and by detecting correlations in the each of the regions, between source data that is equivalent to the input video data, and the data in the first plurality of frequency bands; setting a cutoff frequency based on a result of the analysis of the characteristics of the input video signal, and generating second multiband signals which are obtained by dividing the delayed input video data output from the N line buffer into a second plurality of frequency bands; and adjusting respective amplitudes of the data in the second plurality of frequency bands in the second multiband signals based on the result of the analysis of the characteristics of the input video data, and synthesizing and outputting the data in the second plurality of frequency bands.

DETAILED DESCRIPTION

A Video signal processing device and method according to the embodiment will be explained below with reference to the accompanying drawings.

Figure 1:
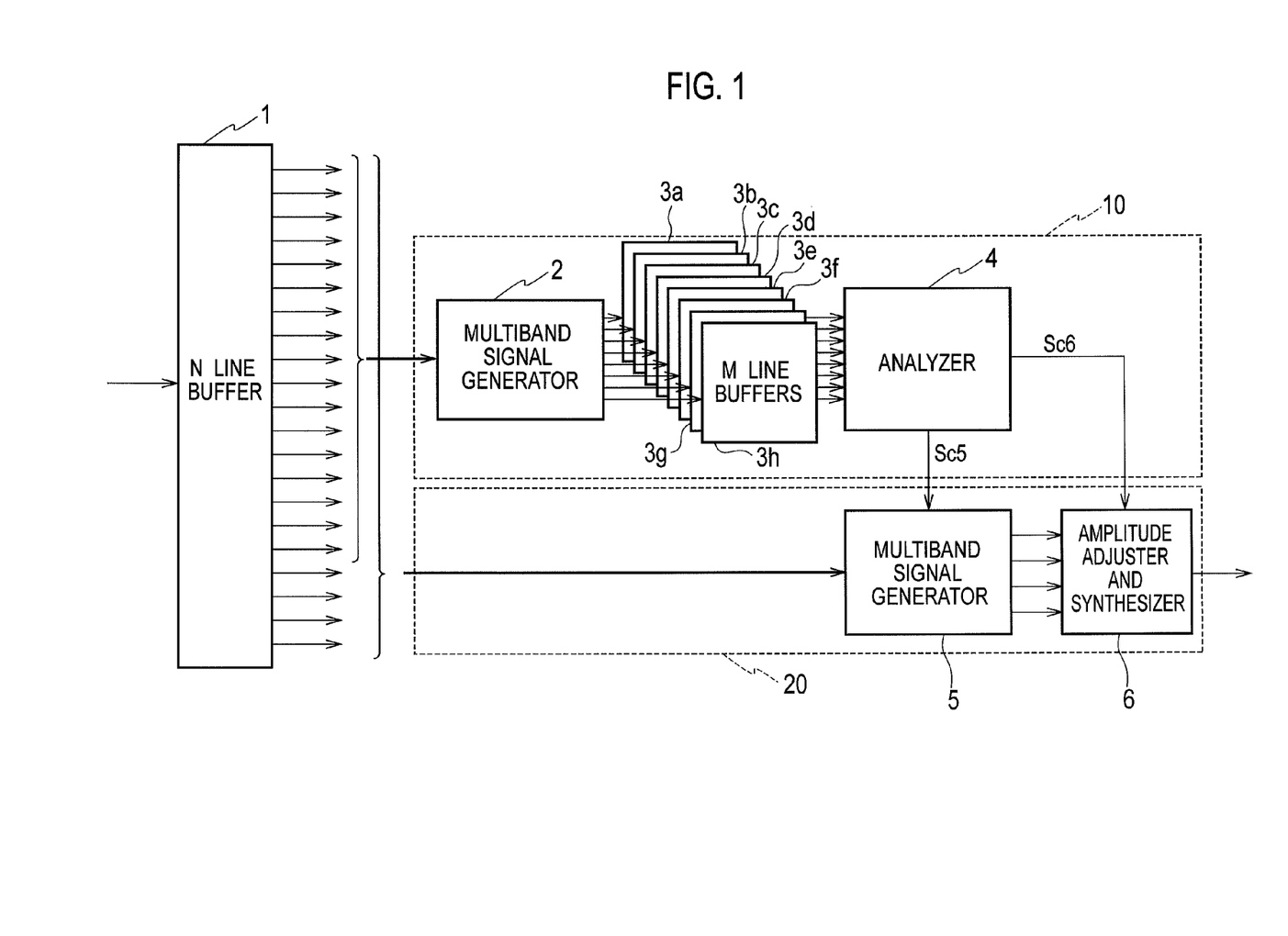
FIG. 1 is a block diagram showing a video signal processing device according to the embodiment.

In FIG. 1, digital video data is input to an N line buffer 1. The N line buffer 1 has line buffers (line memories) for N lines, where N is an integer. In this embodiment, N is set to 21 as an example. The N line buffer 1 delays the input digital video data such that each line is delayed from 1 line to N lines respectively. The digital video data is, for example, 12 bits.

In the output stage of the N line buffer 1, a signal analysis block 10 and a signal processing block 20 are provided. The signal analysis block 10 includes a multiband signal generator 2, a plurality of M line buffers, and an analyzer 4. The signal processing block 20 is provided with a multiband signal generator 5 and an amplitude adjuster and synthesizer 6.

17 lines of buffered data is input to the multiband signal generator 2. It is not necessary to input all 12 bits of data to the signal analysis block 10, so the data for the 17 lines that are input to the multiband signal generator 2 is, for example, 9 bits.

Since the signal analysis block 10 is intended to analyze characteristics of the digital video data, 9 bits are sufficient. By setting the number of bits of data to be input to the signal analysis block 10 to be smaller than the number of bits of the digital video data, the circuit size is reduced.

Figure 2:
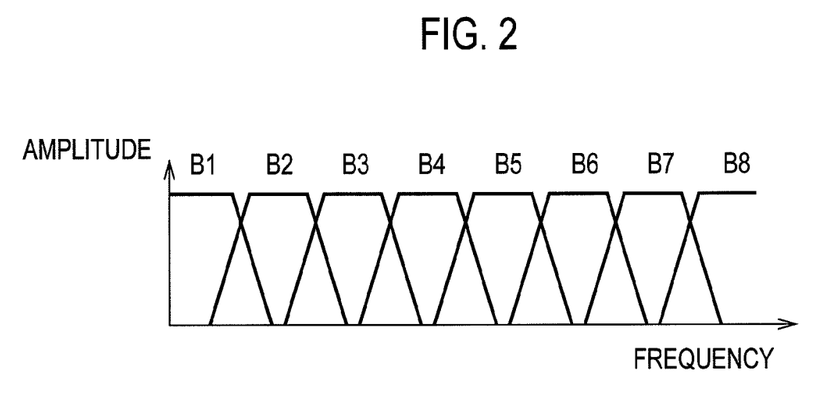
FIG. 2 is a characteristic chart showing multiband signals in eight bands generated by a multiband signal generator 2 shown in FIG. 1.

The multiband signal generator 2 divides the 17 line input data into, for example, eight frequency bands B1 to B8 as shown in FIG. 2, and outputs the divided data as multiband signals. The multiband signal generator 2 may be configured by a two-dimensional FIR filter. The multiband signal generator 2 may be a 17-tap two-dimensional FIR filter.

In the output stage of the multiband signal generator 2, eight M line buffers 3a to 3h are provided corresponding to the eight multiband signals. Meanwhile, 21 lines of data (21 taps) output from the N line buffer 1 is input to the signal processing block 20. M in the M line buffers 3a to 3h is a number that is obtained by deducting the number of taps X of data that is input to the signal analysis block 10 from the number of taps Y of data that is input to the signal processing block 20, and then adding one to the resultant value. In this embodiment, M is obtained from 21-17+1, and is thus 5.

Since M of the M line buffers 3a to 3h is obtained by Y−X+1, timing of signal processing at the signal processing block 20 coincides with timing of signal analysis at the signal analysis block 10.

The multiband signals of the frequency bands B1 to B8 that are output from the multiband signal generator 2 are input to the corresponding M line buffers 3a to 3h such that each line is delayed by between 1 and 5 lines respectively. The data for five lines that is output from the M line buffers 3a to 3h is input to the analyzer 4.

The analyzer 4 analyzes characteristics of the digital video data that is input to the N line buffer 1 by analyzing the multiband signals in the frequency bands B1 to B8 as explained later.

The multiband signal generator 5 in the signal processing block 20 divides the 21 lines of input data into, for example, four frequency bands, and outputs the divided data as multiband signals. The multiband signal generator 5 may be configured by a two-dimensional FIR filter. The multiband signal generator 5 may be a 21-tap two-dimensional FIR filter.

A cutoff frequency of the two-dimensional FIR filter that configures the multiband signal generator 5 is controlled by a filter control signal Sc5 output from the analyzer 4. The four multiband signals that are output from the multiband signal generator 5 are input to the amplitude adjuster and synthesizer 6. The amplitude adjuster and synthesizer 6 adjusts amplitudes of the four multiband signals based on an amplitude control signal Sc6 that is output from the analyzing signal 4, and synthesizes and outputs the four multiband signals with adjusted amplitudes.

Figure 3:
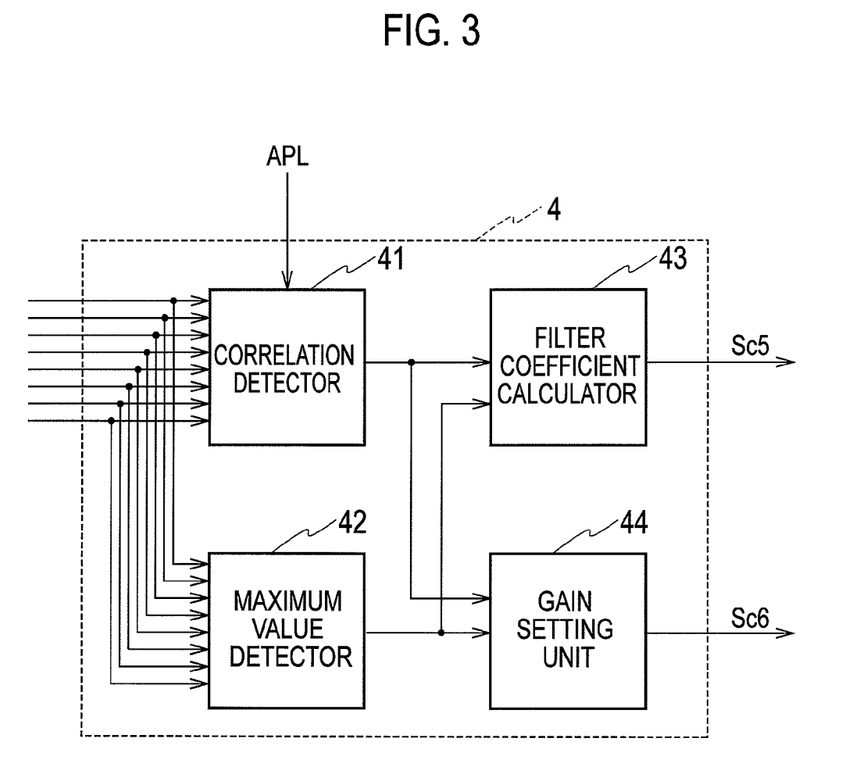
FIG. 3 is a block diagram showing a specific configuration example of an analyzer 4 shown in FIG. 1.

A specific configuration and operation of the analyzer 4 will be explained using FIG. 3. As shown in FIG. 3, the analyzer 4 includes a correlation detector 41, a maximum value detector 42, a filter coefficient calculator 43, and a gain setting unit 44. Although illustration is omitted, the analyzer 4 has a pixel delay device which delays each of the M line buffers 3a to 3h by 5 lines such that input lines from each buffer are delayed by between 1 and 5 pixels respectively.

The correlation detector 41 detects correlation values between source data of the digital video data, and the data in the respective frequency bands B1 to B8. It is preferred that the correlation detector 41 detects correlations after normalization of the source data and that the data in the frequency bands B1 to B8 is in accordance with an average picture level (APL) of the digital video data. The correlation detector 41 sets an optimal region for correlation detection for each of the frequency bands B1 to B8.

Figure 4:
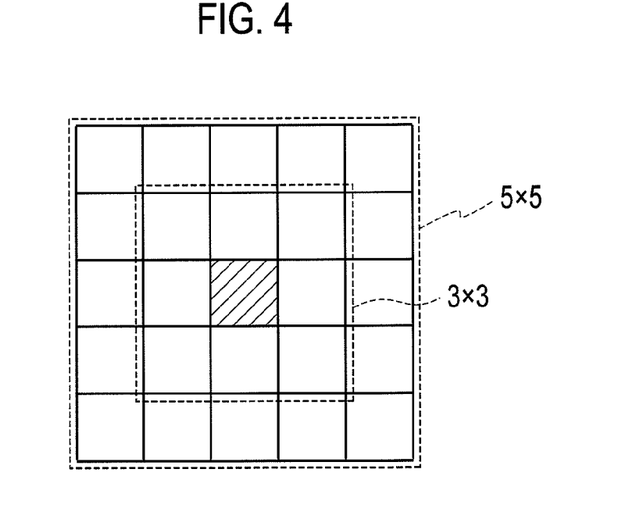
FIG. 4 is a view for explaining a region in which a correlation detector 41 shown in FIG. 3 performs correlation detection.

As shown in FIG. 4, the correlation detector 41 sets a region of 5×5 having five horizontal pixels and five vertical pixels (five lines), or a region of 3×3 having three horizontal pixels and three vertical pixels (three lines), about a central pixel of interest shown with hatched lines.

That is, a region where the correlation detector 41 detects correlation values between the source data of the digital video data and the data in the respective frequency bands B1 to B8 is a region of M×M with a maximum of M horizontal pixels and M vertical pixels (M lines).

In this embodiment, the correlation detector 41 generates the source data of the digital video data by synthesizing the signals in the frequency bands B2 to B8 of the multiband signals excluding the frequency band B1 that has the lowest frequency. Data obtained by removing the frequency band B1 from the entire digital video data may be used as the source data.

The source data that is compared with the data in the respective frequency bands B1 to B8 only needs to be data equivalent to the digital video data.

The correlation detector 41 removes a direct-current component by using the data without the frequency band B1 as the source data. Removing the direct-current component enables the correlation detector 41 to detect correlations between the source data of the digital video data and the data of the respective frequency bands B2 to B8.

The maximum value detector 42 detects a maximum value among the multiband signals in the frequency bands B2 to B8.

The filter coefficient calculator 43 generates and outputs the filter control signal Sc5 that controls the cutoff frequency of the two-dimensional FIR filter which configures the multiband signal generator 5, based on the correlation values detected in the correlation detector 41 for the respective frequency bands B2 to B8, and the maximum value detected in the maximum value detector 42 among the multiband signals in the frequency bands B2 to B8.

The gain setting unit 44 generates and outputs an amplitude control signal Sc6 that controls amplitudes of multiband signals when the amplitude adjuster and synthesizer 6 synthesizes the multiband signals in four bands. The control signal is based on the correlation values detected in the correlation detector 41 for the respective frequency bands B2 to B8, and the maximum value detected in the maximum value detector 42 among the multiband signals in the frequency bands B2 to B8.

When gain is increased by the gain setting unit 44 in order to control amplitudes of the multiband signals, a threshold value of maximum amplitude that the multiband signals are allowed to have may be exceeded. Thus, the gain setting unit 44 sets gain based on the maximum value detected in the maximum value detector 42 so that the threshold value of the maximum amplitude is not exceeded.

Figure 5:
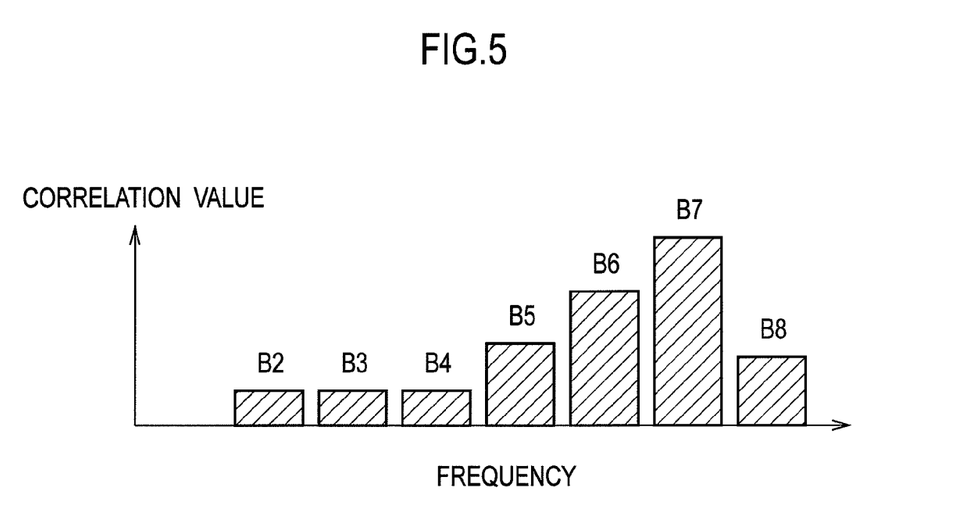
FIG. 5 is a view showing an example of a histogram of correlation values per frequency band, the correlation values being detected by the correlation detector 41 shown in FIG. 3.

FIG. 5 shows an example of a histogram of the correlation values detected in the correlation detector 41 for the respective frequency bands B2 to B8. In the example shown in FIG. 5, while the correlation value increases in sequence from the frequency band B5 through the frequency band B7, the correlation value in the frequency band B8 is less than B7. Normally, the correlation value in the frequency band B8 should be greater.

The example shown in FIG. 5 represents a characteristic where the high frequency band part is attenuated. Thus, in the case of the histogram of correlation values shown in FIG. 5, the signal processing block 20 is caused to operate as an enhancement circuit.

Figure 6:
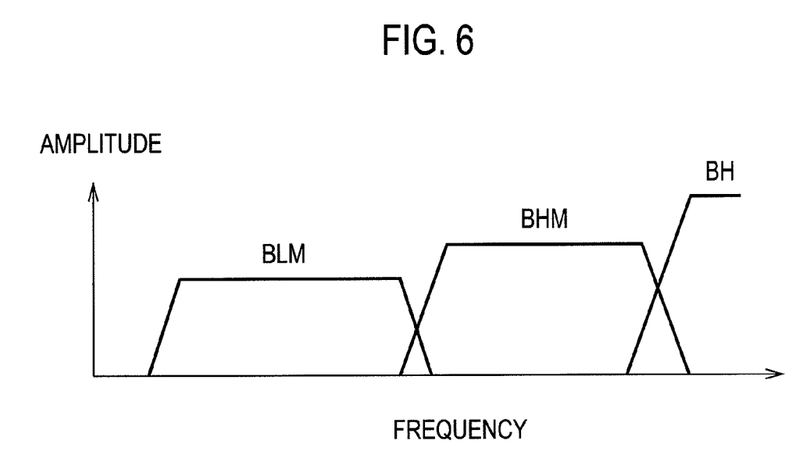
FIG. 6 is a view showing examples of cutoff frequencies set in the multiband signal generator 5 shown in FIG. 1, and amplitudes set in an amplitude adjuster and synthesizer 6 when the histogram of correlation values in FIG. 5 is applied.

In this case, the characteristics of the two-dimensional FIR filter that configures the multiband signal generator 5, and amplitudes in the amplitude adjuster and synthesizer 6 are set as shown in FIG. 6. Of the four multiband signals that are output from the multiband signal generator 5, the lowest frequency band is a signal that passes through a low-pass filter with a fixed cutoff frequency.

Therefore, FIG. 6 shows only three bands, which are; a middle-low frequency band BLM, a middle-high frequency band BHM, and a high frequency band BH, excluding the band with the lowest frequency.

The filter coefficient calculator 43 sets cutoff frequencies of the frequency bands BLM, BHM, and BH to the positions shown in FIG. 6. The gain setting unit 44 sets gain so that amplitude of the frequency band BHM is increased to some extent, and amplitude of the high frequency band BH is increased significantly.

Figure 7:
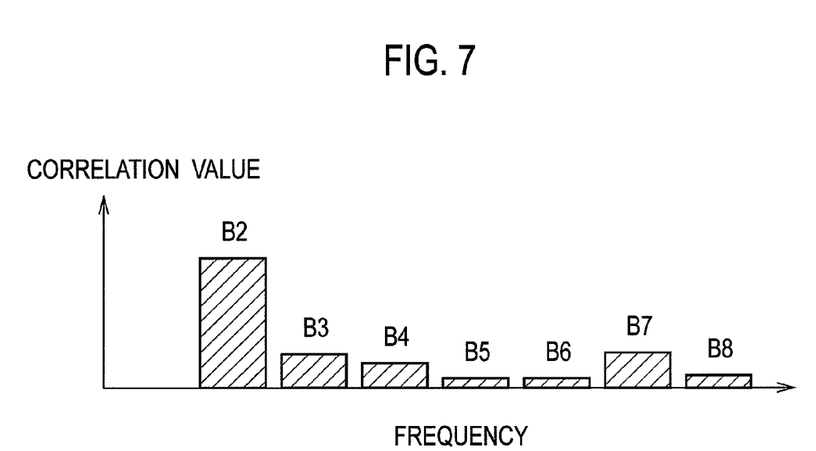
FIG. 7 is a view showing another example of a histogram of correlation values per frequency band, the correlation values being detected by the correlation detector 41 shown in FIG. 3.

FIG. 7 shows another example of a histogram of the correlation values detected in the correlation detector 41 for the respective frequency bands B2 to B8. In the example shown in FIG. 7, the correlation value for the frequency band B2 is large, and the correlation values decrease drastically for the frequency bands B3 and after. The correlation value is greater for the frequency band B7 than those for the frequency bands B6 and B8.

The example shown in FIG. 7 represents a characteristic where there are less high frequency band components and an image is defocused. The frequency band B7 represents a characteristic where noise is generated. Thus, in the case of the histogram of the correlation values shown in FIG. 7, the signal processing block 20 is caused to operate as a smoothing circuit and a noise reduction circuit.

Figure 8:
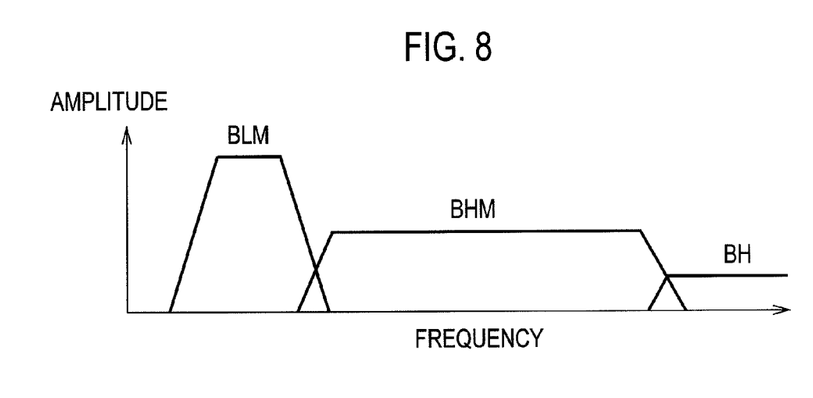
FIG. 8 is a view showing examples of cutoff frequencies set in the multiband signal generator 5 shown in FIG. 1, and amplitudes set in the amplitude adjuster and synthesizer 6 when the histogram of the correlation values in FIG. 7 is applied.

In this case, the characteristics of the two-dimensional FIR filter that constructs the multiband signal generator 5, and amplitudes in the amplitude adjuster and synthesizer 6 are set as shown in FIG. 8. The filter coefficient calculator 43 sets cutoff frequencies for the frequency bands BLM, BHM, and BH to positions shown in FIG. 8.

The gain setting unit 44 sets gain so that amplitude in the frequency band BLM is increased in order to emphasize defocus of the image. The gain setting unit 44 sets gain so that amplitude in the frequency band BH is reduced in order to reduce noise.

Figure 9:
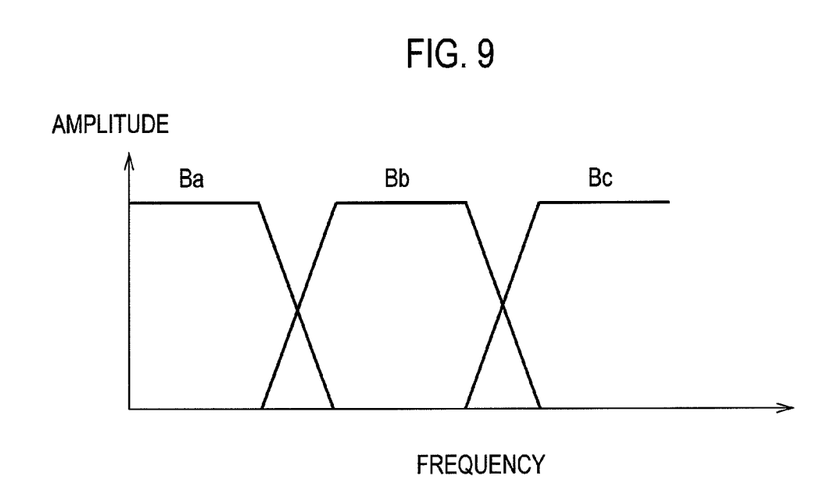
FIG. 9 is a characteristic chart showing multiband signals in three bands.

A specific example will be explained using FIG. 9, FIG. 10A and FIG. 10B regarding operations of the correlation detector 41 to detect correlations in a case where the signal processing block 20 is caused to operate as an enhancement circuit. As explained above, the correlation detector 41 detects correlations between source data and data in the seven frequency bands B2 to B8. However, to simplify the explanation, a case will be explained where correlations between source data and data in the three bands shown in FIG. 9 are detected.

Figure 10A:
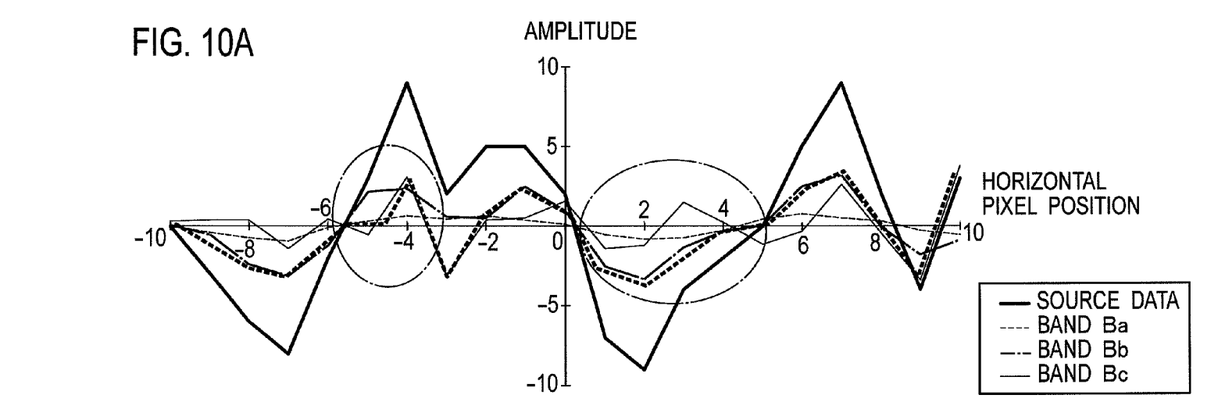
FIG. 10A and FIG. 10B are waveform charts for explaining specific examples in a case where correlations between the source data and the data in the three bands shown in FIG. 9 are detected.

It is assumed that source data that is input to the multiband signal generator 2 has the waveform indicated by the thick solid line shown in FIG. 10A. Horizontal pixel position is plotted on the abscissas, and amplitude is plotted on the ordinate in FIG. 10A and FIG. 10B. When the multiband signal generator 2 divides the source data into the three frequency bands Ba, Bb, and Bc as shown in FIG. 9, waveforms of the respective bands become those shown in FIG. 10A. The waveform indicated by a broken line is the waveform of the frequency band Ba, the waveform indicated by a thick alternate long and short dash line is the waveform of the frequency band Bb, and the waveform indicated by a thin solid line is the waveform of the frequency band Bc.

As the correlation detector 41 detects correlations between the source data and the data in the three frequency bands Ba, Bb, and Bc and selects data with the greatest correlation value, data with the waveform indicated by the thick broken line shown in FIG. 10A is obtained.

Figure 10B:
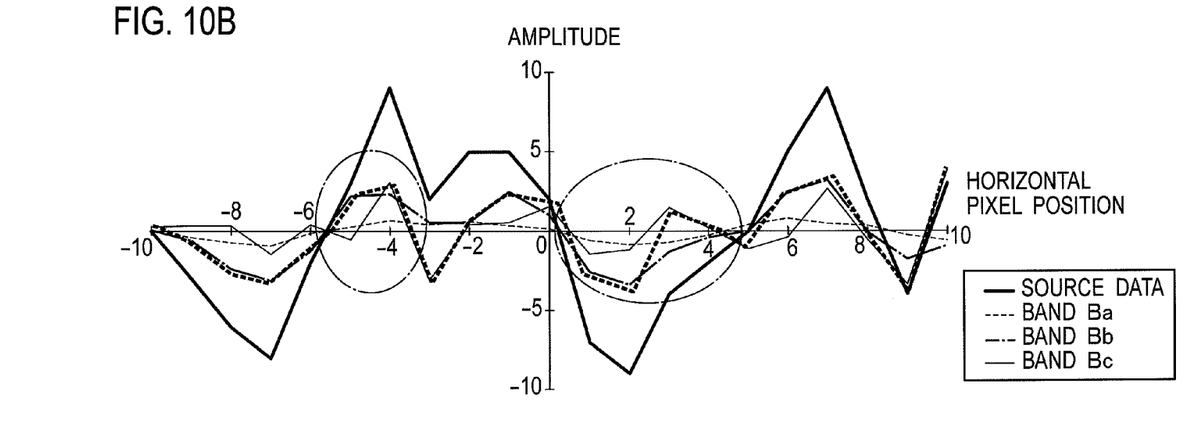

FIG. 10B shows waveforms for comparison in a case where maximum values of the data in the three frequency bands Ba, Bb, and Bc are detected, instead of detecting correlations between the source data and the data in the three frequency bands Ba, Bb, and Bc.

As evident from a comparison between the areas surrounded by an alternate long and short dash line in FIG. 10A and FIG. 10B, the waveform in FIG. 10A is similar to that of the source data. Therefore, in this embodiment, noise reduction, enhancement, and smoothing are able to be executed naturally.

As explained so far, in the embodiment shown in FIG. 1, it is possible to optimally execute at least one of noise reduction, enhancement, and smoothing of a video signal in accordance with the characteristics of the video signal. Also, in the embodiment, noise reduction, enhancement, and smoothing are able to be executed selectively.

In the embodiment, as shown in FIG. 1, since the signal analysis block 10 and the signal processing block 20 share the same N line buffer 1, the circuit size is reduced. Since the number of bits of the data that is input to the signal analysis block 10 is less than the number of bits of the data that is input to the signal processing block 20, the circuit size is reduced.

The present invention is not limited to the embodiment described above, and various changes may be made without departing from the gist of the present invention. N of the N line buffer 1 (the number of taps N in the multiband signal generator 5), the number of taps X of the multiband signal generator 2, and M of the M line buffers 3a to 3h may be set as appropriate.

What is claimed is:

1. A video signal processing device comprising:
    an N line buffer configured to delay input video data such that lines are delayed from 1 line to N lines respectively to create delayed input video data, where N is an integer of 2 or greater;
    a first multiband signal generator configured to generate first multiband signals that are obtained by dividing the delayed input video data output from the N line buffer into a first plurality of frequency bands, each having data lines delayed from 1 line to X lines respectively, where X is an integer of 2 or greater and smaller than N;
    M line buffers configured to delay each of the data in the first plurality of frequency bands output from the first multiband signal generator such that lines are delayed from 1 line to M lines respectively, where M is an integer;
    an analyzer configured to analyze characteristics of the input video data by selecting regions with a maximum of M horizontal pixels and M vertical lines in the data in the first plurality of frequency bands which is output from the M line buffers such that lines are delayed from 1 line to M lines respectively, and to detect correlations in each of the regions, between source data that is equivalent to the input video data, and the data in the first plurality of frequency bands;
    a second multiband signal generator configured to set a cutoff frequency based on a result of the analysis by the analyzer, and generate second multiband signals which are obtained by dividing the delayed input video data output from the N line buffer into a second plurality of frequency bands; and
    an amplitude adjuster and synthesizer configured to adjust respective amplitudes of the data in the second plurality of frequency bands output from the second multiband signal generator, based on the result of the analysis by the analyzer, and to synthesize and output the data in the second plurality of frequency bands.

2. The video signal processing device according to claim 1, wherein the first multiband signal generator is an X-tap FIR filter, and the second multiband signal generator is an N-tap FIR filter.

3. The video signal processing device according to claim 1, wherein M in the M line buffers is set to a number so that timing of processing by the second multiband signal generator and the amplitude adjuster and synthesizer coincides with timing of processing by the first multiband signal generator, the M line buffers, and the analyzer.

4. The video signal processing device according to claim 3, wherein M is a number obtained from N−X+1.

5. The video signal processing device according to claim 1, wherein the second plurality of frequency bands is less than the first plurality of frequency bands.

6. The video signal processing device according to claim 1, wherein a number of bits of data that is input to the first multiband signal generator is less than a number of bits of data that is input to the second multiband signal generator.

7. A video signal processing method comprising:
    delaying input video data such that each line is delayed from 1 line to N lines respectively to create delayed input video data using an N line buffer, where N is an integer of two or greater;
    generating first multiband signals that are obtained by dividing the delayed input video data into a first plurality of frequency bands, having data lines delayed from 1 line to X lines respectively, where X is an integer of 2 or greater and smaller than N;
    delaying each of the data in the first plurality of frequency bands in the first multiband signals such that lines are delayed from 1 line to M lines respectively by using M line buffers, where M is an integer;
    analyzing characteristics of the input video data by selecting regions with a maximum of M horizontal pixels and M vertical lines in the data in the first plurality of frequency bands which is delayed by the M line buffers such that lines are delayed from 1 line to M lines respectively, and by detecting correlations in the each of the regions, between source data that is equivalent to the input video data, and the data in the first plurality of frequency bands;
    setting a cutoff frequency based on a result of the analysis of the characteristics of the input video signal, and generating second multiband signals which are obtained by dividing the delayed input video data output from the N line buffer into a second plurality of frequency bands; and
    adjusting respective amplitudes of the data in the second plurality of frequency bands in the second multiband signals based on the result of the analysis of the characteristics of the input video data, and synthesizing and outputting the data in the second plurality of frequency bands.

8. The video signal processing method according to claim 7, wherein the first multiband signals are generated by using an X-tap FIR filter, and the second multiband signals are generated by using an N-tap FIR filter.

9. The video signal processing method according to claim 7, wherein the second plurality of frequency bands is less than the first plurality of frequency bands.

10. The video signal processing method according to claim 7, wherein a number of bits of data in each of the first multiband signals is less than a number of bits of data in each of the second multiband signals.

* * * * *